(12) United States Patent
Wazana et al.

(10) Patent No.: US 10,543,440 B2
(45) Date of Patent: Jan. 28, 2020

(54) REASSEMBLED LIQUID FILTRATION ASSEMBLY AND METHOD OF MANUFACTURE

(76) Inventors: Yoel Wazana, Chatsworth, CA (US); Sagie Shanun, Valley Village, CA (US)

(*) Notice: Subject to any disclaimer, the term of this patent is extended or adjusted under 35 U.S.C. 154(b) by 0 days.

(21) Appl. No.: 13/197,493

(22) Filed: Aug. 3, 2011

(65) Prior Publication Data
US 2013/0032528 A1 Feb. 7, 2013

(51) Int. Cl.
*B01D 35/30* (2006.01)
*B23P 6/00* (2006.01)

(52) U.S. Cl.
CPC ........... *B01D 35/30* (2013.01); *Y10T 29/4973* (2015.01)

(58) Field of Classification Search
CPC ............ B01D 35/30; B01D 2201/0415; B01D 2201/307; B01D 2201/308; B01D 2201/40
USPC ......... 210/435, 232, 234, 493.2, 767, 510.1; 29/402.08
See application file for complete search history.

(56) References Cited

U.S. PATENT DOCUMENTS

| | | | |
|---|---|---|---|
| 4,683,057 A * | 7/1987 | Krause et al. | 210/232 |
| 7,241,329 B2 * | 7/2007 | Weber | 95/278 |
| 2002/0070181 A1 * | 6/2002 | Deanda et al. | 210/767 |
| 2005/0000867 A1 * | 1/2005 | Haynes et al. | 210/87 |
| 2007/0158263 A1 * | 7/2007 | Brandt et al. | 210/437 |
| 2007/0246433 A1 * | 10/2007 | Zuberi | 210/749 |
| 2010/0032353 A1 * | 2/2010 | Frandsen | 210/86 |

* cited by examiner

*Primary Examiner* — Madeline Gonzalez

(57) ABSTRACT

A method is disclosed. The method provides an assembly comprising a first core disposed within a housing, and replaces the first core with a second core.

21 Claims, 26 Drawing Sheets

REASSEMBLED LIQUID FILTRATION ASSEMBLY AND METHOD OF MANUFACTURE

FIELD

The present invention relates generally to the field of water/liquid filters and more specifically to the field of remanufacturing such water/liquid filters.

BACKGROUND

Most people install water filter assemblies 10 shown in FIG. 1a to remove impurities, harmful chemical materials, and toxic metals from water as well as to give water a good taste and look. To clean/purify the water, water filter assemblies 10 may be used with kitchen sinks, refrigerators, beverage dispensing machines, and/or any filtration system like, for example, fish tanks.

Referring to FIG. 1b, as known in the art, the water filter assembly 10 may comprise a core/filter 20, a housing 30 configured to at least partially accommodate the core/filter 20, and a cap/cover/lid 40 configured to seal the core/filter 20 within the housing 30. The water filter assembly 10 may also comprise at least one end cap 45. The core/filter 20 may be used to remove impurities, chlorine, toxic metals and harmful chemical materials from drinking water. The core/filter 20 may be a carbon block made out of extruded carbon powder with a binding polymer. The core/filter 20 may, for example, comprise carbon, fiber, a combination of carbon and fiber and/or other material able to remove impurities and/or chemicals and/or harmful chemicals and/or metals and/or toxic metals from water. The carbon used for the core/filter 20 may be granular carbon. The housing 30 and/or cap/lid/cover 40 may, for example, comprise plastic and or metal.

Although the core/filter 20 is depicted as having a rounded bottom edge, it is known in the art that the other core/filters 21, 22 and 23, shown in FIGS. 1d-f, may have flat top edge and flat bottom edge.

According to the prior art, the end cap 45 may be glued or pressure fitted to the core/filter 20 as shown in FIGS. 1c and 1e and may be used to keep the core/filter 20 stationary within the filter assembly 10. According to the prior art, the water filter assembly 10 may also comprise another end cap 46 as shown in FIG. 1d. The end cap 46 may be also be glued or pressure fitted to the core/filter 20 as shown in FIG. 1d and may be used to keep the core/filter 20 stationary within the filter assembly 10.

Referring to FIGS. 1a-b, when the core/filter 20 is sealed within the housing 30 by the cap/lid/cover 40, the unfiltered water may, for example, enter the water filter assembly 10 through an opening 50 defined by the protrusion 65 and exit through the opening 60 defined by the protrusion 65 after passing though the core/filter 20 that removes the impurities and/or harmful chemical materials.

Because core/filter 20 is used to remove impurities, chlorine, toxic metals and harmful chemical materials from drinking water, the water filtration efficiency and the water pressure of the filter assembly 10 is reduced over time due to blockage of the porous surface of the core/filter 20 by the impurities absorbed from the water. Due to reduction in water filtration efficiency and the water pressure, the core/filter 20 has a limited life cycle and the water filter assembly 10 needs to be replaced on a regular basis. While the core/filter 20 may have a limited life cycle, the housing 30, the lid/cap/cover 40 and/or the end caps 45, 46 typically do not degrade and/or wear out and may be reused. To reduce waste, a need exists for a process and associated apparatus by which the core/filter 20 is replaced with a new core/filter and the housing 30, the lid/cap/cover 40 and/or the end caps 45, 46 are reused or replaced with the new core/filter.

SUMMARY

According to a first aspect, a method is disclosed, comprising: providing a liquid filtration assembly comprising a first core disposed within a housing; and
replacing the first core with a second core.

According to a second aspect, a method is disclosed, comprising: providing a liquid filtration assembly comprising a first core disposed within a housing; separating the liquid filtration assembly into a first section and a second section; and
removing the first core.

According to a third aspect, a method is disclosed, comprising: providing at least a first section and a second section of a liquid filtration assembly; positioning at least a portion of a core in either the first section or the second section of the liquid filtration assembly; and coupling the first section and the second section According to a fourth aspect, a liquid filtration assembly is disclosed, comprising: a cover; a housing associated with the cover; and a core at least partially disposed within the housing, wherein the housing and the cover are recycled after being associated with another core.

BRIEF DESCRIPTION OF THE FIGURES

FIG. 1b depicts an expended view of the water filter assembly shown in FIG. 1a.

In the following description, like reference numbers are used to identify like elements. Furthermore, the drawings are intended to illustrate major features of exemplary embodiments in a diagrammatic manner. The drawings are not intended to depict every feature of every implementation nor relative dimensions of the depicted elements, and are not drawn to scale.

DETAILED DESCRIPTION

In the following description, numerous specific details are set forth to clearly describe various specific embodiments disclosed herein. One skilled in the art, however, will understand that the presently claimed invention may be practiced without all of the specific details discussed below. In other instances, well known features have not been described so as not to obscure the invention.

Figure 1A:
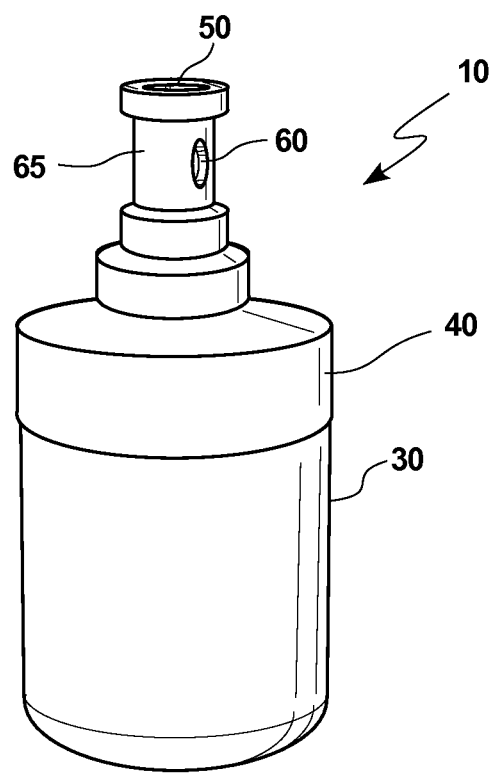
FIG. 1a depicts a water filter assembly as known in the art.
Figure 1B:
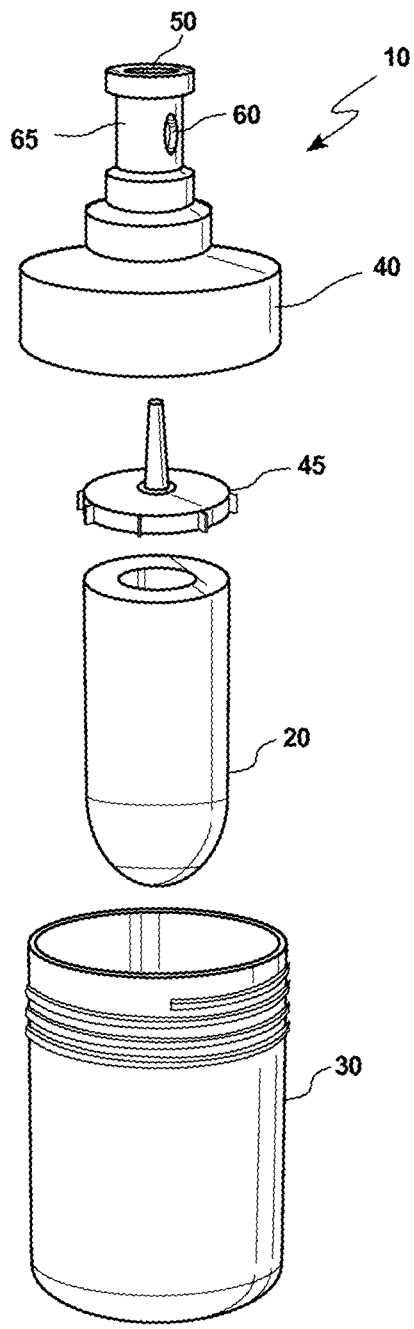

Referring to FIGS. 1a-b, as known in the art, to accommodate water pressure and/or to prevent users from accessing the core/filter 20, manufacturers of the water filter assemblies 10 securely couple the cap/cover/lid 40 to the housing 30. The cap/cover/lid 40 may be securely coupled to the housing 30 using different welding techniques known in the art; using different adhesives known in the art; the cap/cover/lid 40 may be coupled to the housing 30 using regular thread techniques; the cap/cover/lid 40 may be coupled to the housing 30 using reverse thread and/or pressure fit techniques; the cap/cover/lid 40 may be heat sealed with/to the housing 30; and/or the cap/cover/lid 40 may be coupled to the housing 30 using any combination of the above mentioned techniques.

Figure 2:
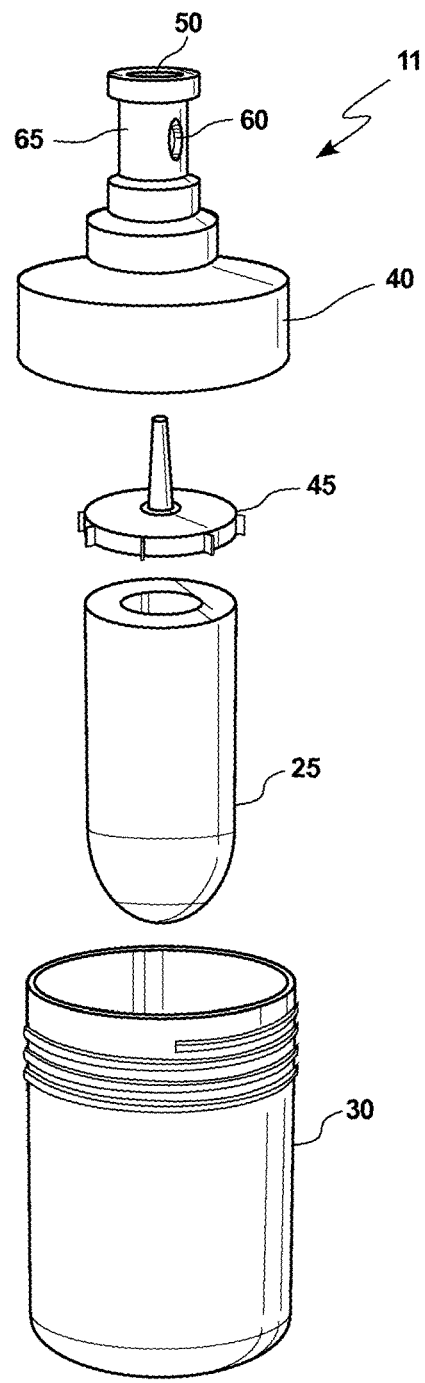
FIG. 2 depicts an exemplary embodiment of a water filter assembly.

In an effort to re-use/recycle the cap/cover/lid 40, the housing 30, and/or the end caps 45, 46, there should be sufficient access to the original water filter assembly 10 to allow the replacement of the old/used core/filter 20 (shown in FIG. 1b) with the new core/filter 25 (shown in FIG. 2) to provide a remanufactured water filter assembly 11 (shown in FIG. 2). In one exemplary embodiment, the removed old/used core/filter 20 may also be remanufactured and or recycled for other uses. For example, the removed old/used core/filter 20 may be reused as filler for coating applications such as, for example, paint or filler for plastic applications.

Because the original water filter assembly 10 may still contain moisture/water inside the housing 30, in one exemplary embodiment according to the present disclosure the original water filter assembly 10 may go through a water removing process prior to removal of the old/used core/filter 20. In one exemplary embodiment, the original water filter assembly 10 may be placed in a centrifuge and spun until any remaining water/moisture is forced out through the opening 50 and/or 60. In another exemplary embodiment, any remaining water/moisture in the water filter assembly 10 may be removed by blowing air through the opening 50 and/or 60.

Once the original water filter assembly 10 is ready for remanufacturing the old/used core/filter 20 is replaced with a new core/filter 25 as shown in FIG. 2. The core/filter 25 may be a carbon block made out of extruded carbon powder with a binding polymer. The core/filter 25 may, for example, comprise carbon, fiber, a combination of carbon and fiber and/or other material able to remove impurities and/or chemicals and/or harmful chemicals and/or metals and/or toxic metals from water. The carbon used for the core/filter 25 may be granular carbon.

Figure 3A:
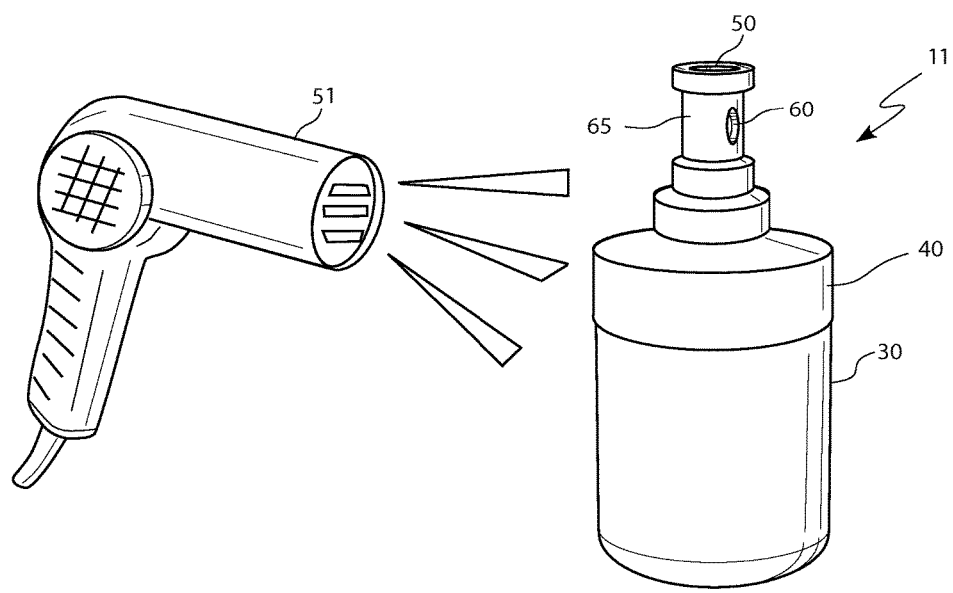
FIGS. 3a-b depict exemplary embodiments for disassembling a water filter assembly.
Figure 3B:
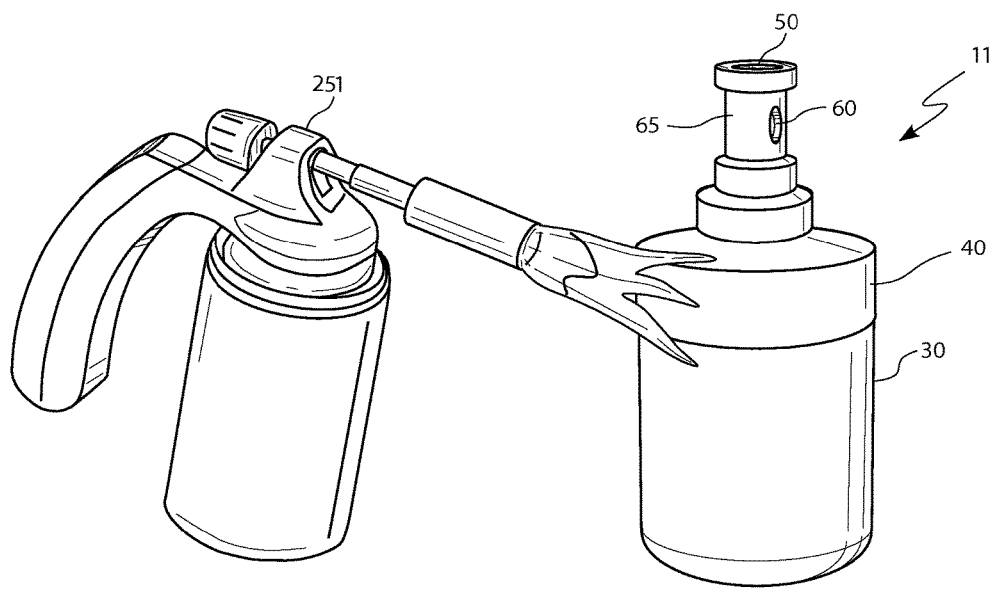
Figure 4:
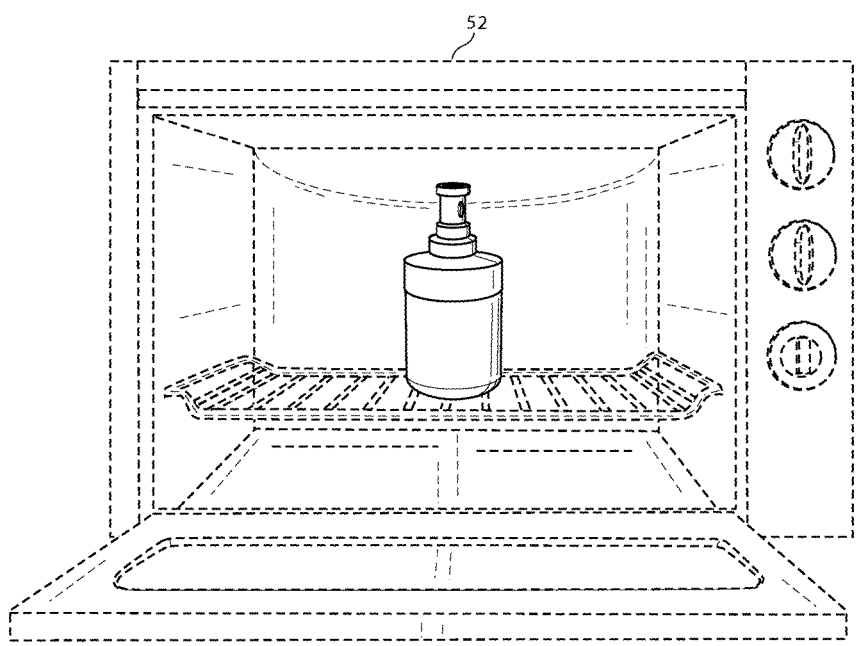
FIG. 4 depicts another exemplary embodiment for disassembling a water filter assembly.

If the cap/cover/lid 40 is glued to the housing 30, in one exemplary embodiment according to the present application, the old/used core/filter 20 may be removed by heating up the area around the cap/cover/lid 40 until the adhesive coupling the cap/cover/lid 40 and the housing 30 has sufficiently melted/loosened to allow the removal of the cap/cover/lid 40 from the housing 30. The heating process may be accomplished by either applying direct heat using, for example, a heating fan 51 (shown in FIG. 3a) or a flame torch 251 (shown in FIG. 3b) to the area around the cap/cover/lid 40 (shown in FIGS. 3a-b) or by placing the entire water filter assembly 10 into an oven/microwave 52 as shown in FIG. 4. Once the housing 30 is removed from the cap/cover/lid 40, the old/used core/filter 20 is replaced with a new core/filter 25 and the housing 30 and the cap/cover/lid 40 may be coupled with/to each other using an adhesive capable of holding both pieces even during the filtration of the water.

Figure 5A:
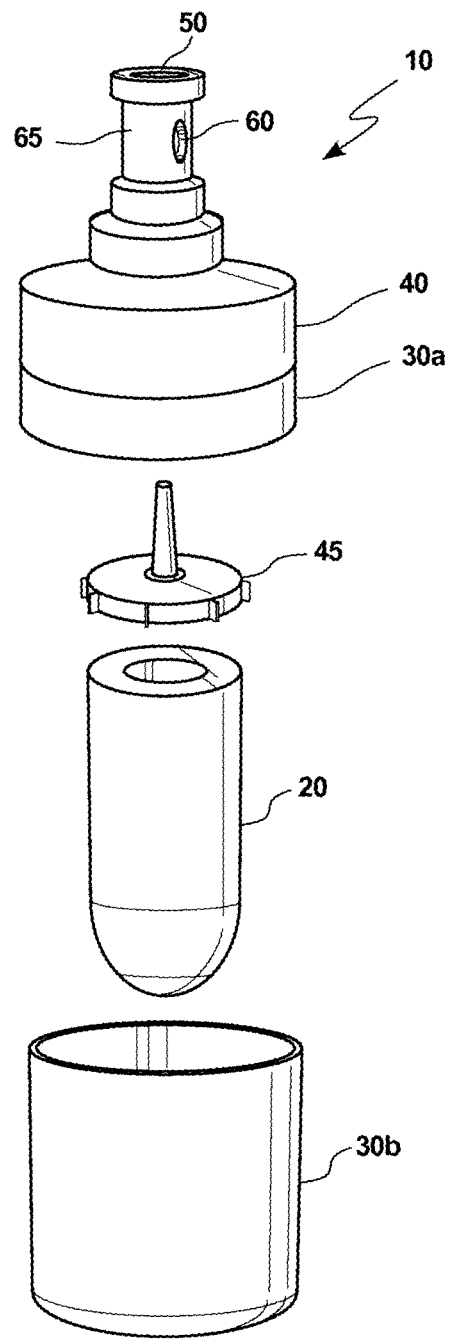
FIGS. 5a-b depict additional exemplary embodiments for disassembling a water filter assembly.
Figure 5B:
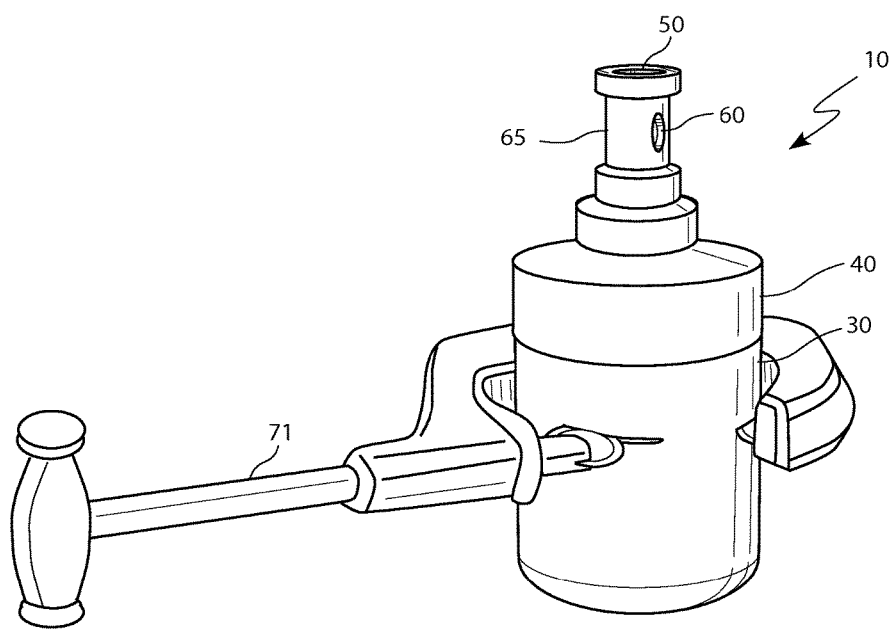

In another exemplary embodiment according to the present application, the old/used core/filter 20 may be removed by cutting the housing 30 into sections 30a and 30b as shown in FIG. 5a. The cutting process may be accomplished by using a pipe cutter 71 as shown in FIG. 5b, a saw machine (not shown), a laser-cutting machine (not shown), a Computer Numerical Control (CNC) machine (not shown), and/or an ultrasonic blade machine (not shown).

Figure 1C:
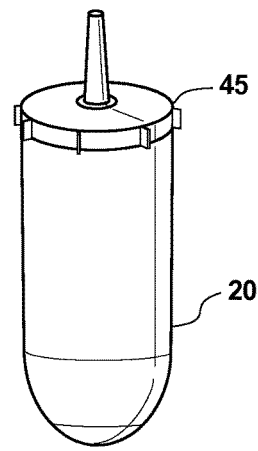
FIGS. 1c-f depict exemplary cores/filters as known in the art.
Figure 1D:
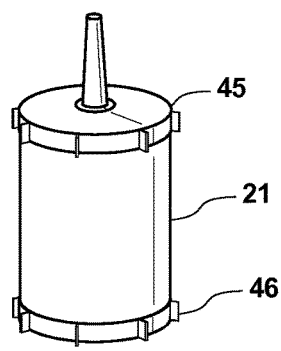
Figure 1E:
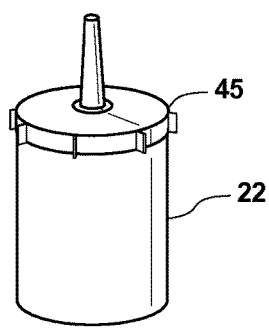
Figure 1F:
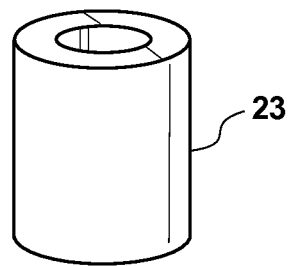

In one exemplary embodiment, once the housing sections 30a and 30b are separated as shown in FIG. 5a, the end cap 45 (shown in FIG. 5a) and/or 46 (shown in FIG. 1d) may also be recycled/reused once the old/used core/filter 20 (shown in FIG. 1c) or the old/used core/filter 21 (shown in FIG. 1d) are removed from the housing 30. In one exemplary embodiment, this may be accomplished by applying sufficient force to break the connection between the old/used core/filter 20 and the end cap 45. In another exemplary embodiment, the end cap 45 be removed by heating up the area around the end cap 45 until the adhesive coupling between the end cap 45 and the core/filter 20 has sufficiently melted/loosened to allow the removal of the end cap 45 from the core/filter 20. In one exemplary embodiment, the adhesive coupling between the end cap 45 and the core/filter 20 may be melted/loosened by applying heat at, for example, 200 F for about 10-20 minutes. In another exemplary embodiment, the end cap 45 and the core/filter 20 may be frozen to the point at which the adhesive becomes brittle and will break when a force is applied to separate the end cap 45 from the core/filter 20. In another exemplary, the end cap 45 and the core/filter 20 may be frozen followed by application of heat to cause thermal shock that would cause the adhesive to release the end cap 45 from the core/filter 20.

Once the end cap 45 is removed from the core/filter 20, the end cap 45 may be coupled to the new core/filter 25 before the new core/filter 25 is sealed within the reused housing 30. The end cap 45 may be coupled to the new core/filter 25 using the adhesive 82 described presently and shown in FIG. 9. In one exemplary embodiment, the end cap 45 may be coupled to the new core/filter 25 using, for example, hotmelt process, a polypropylene plastic adhesive or any other adhesive that does not contain hazardous ingredients that may be toxic to human consumption.

In one exemplary embodiment, prior to coupling the end cap 45 to the new core/filter 25, the end cap 45 may be cleaned by removing any residue adhesive and/or carbon that may remain after the end cap 45 is removed from the core/filter 20. It is to be understood, that the process of removing, cleaning, and/or reusing the end cap 45 may similarly be applied to removal, cleaning, and/or reusing of the end cap 46.

In one exemplary embodiment, once the housing sections 30a and 30b are separated as shown in FIG. 5a, the sections 30a and 30b may be washed, dried and sanitized to remove any, bacteria, viruses, impurities, chlorine, toxic metals and/or harmful chemical materials that may have been deposited during the previous use of the water filter assembly 10. In one exemplary embodiment, a dishwasher may be used to clean the sections 30*a* and 30*b*. In one exemplary embodiment, a sanitation machine may be used to disinfect the sections 30*a* and 30*b*.

Figure 6A:
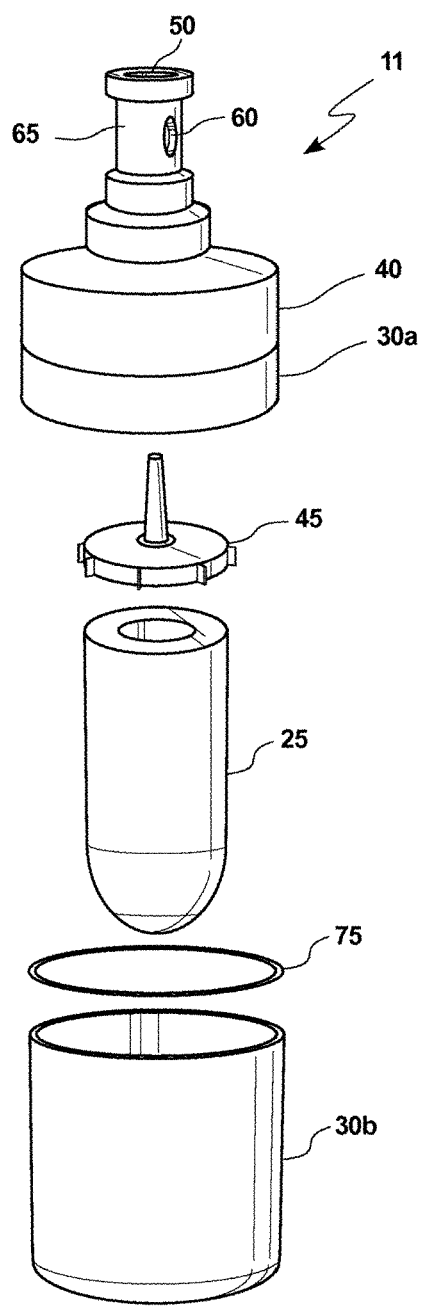
FIGS. 6a-d depict exemplary embodiments for assembling a water filter assembly.

In one exemplary embodiment, once the housing sections 30*a* and 30*b* are separated as shown in FIG. 5*a* and the old/used core/filter 20 is replaced with a new core/filter 25 as shown in FIG. 6*a*, the housing sections 30*a* and 30*b* may be joined together to create a remanufactured water filter assembly 11 as shown in FIG. 6*a*. If the housing 30 is split/cut into sections 30*a* and 30*b* as shown in FIG. 5*a* using a saw machine (not shown), a portion of the material from the housing 30 may be lost. In one exemplary embodiment, energy director material 75, shown in FIG. 6*a*, may be used to join the sections 30*a* and 30*b* and to return the remanufactured water filter assembly 11 to original equipment specifications or as close to possible to original equipment specifications. It has been found that by using material that is the same as the material of the housing 30, and placing this material between the sections 30*a* and 30*b* prior to ultrasonic welding, this material may function as an energy director during the ultrasonic welding process. It may also function to replace material that has been lost due to the cutting in the disassembly process. The energy director material 75 may be available, for example, from Shoon Industries, and it may be available in sizes and thicknesses made to order for the particular application at hand.

As will be appreciated, the type of material used, shapes and dimensions of the energy director material 75 may be varied according to the material of the housing 30 and the degree and location of the original housing 30 material lost during the disassembly process. Typically the housing 30, as well as the energy director material 75 may be made from food grade thermoplastic polymer such as, for example, Poly Ethylene and/or Poly Propylene. The height of an energy director material 75 may be dictated by the amount of material lost when sawing or otherwise separating the housing 30 into section 30*a* and 30*b*. Varying the height or thickness of the energy director material 75 in this way enables the remanufactured water filter assembly 11 to be brought back to the original specification of the housing 30 prior to disassembly. Thus, the resulting remanufactured water filter assembly 11 provides for a quality water filtration as close as possible to that of the water filter assembly 10.

Once the energy director material 75 is placed between the sections 30*a* and 30*b*, an ultrasonic welding machine (not shown) may be used to transmit vibrations at an ultrasonic frequency and pressure large enough to melt the energy director material 75 and to fuse or weld together the sections 30*a* and 30*b*, thereby sealing the new core/filter 25 in the remanufactured water filter assembly 11. The welding may take a few seconds, depending on the type and thickness of the energy director material 75 and depending on the type and thickness of the housing 30.

In another exemplary embodiment, the sections 30*a* and 30*b* may be welded using an ultrasonic welding machine without the energy director material 75. The ultrasonic welding machine (not shown) may transmit vibrations at an ultrasonic frequency and pressure large enough to fuse or weld together the sections 30*a* and 30*b* without the energy director material 75 thereby sealing the new core/filter 25 in the remanufactured water filter assembly 11.

Figure 6B:
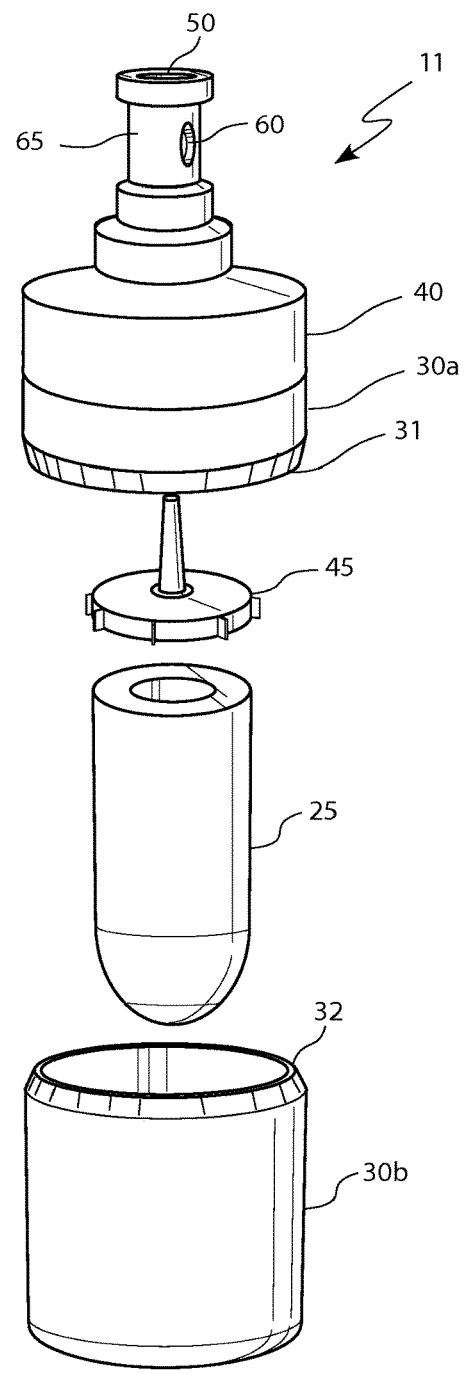
Figure 6C:
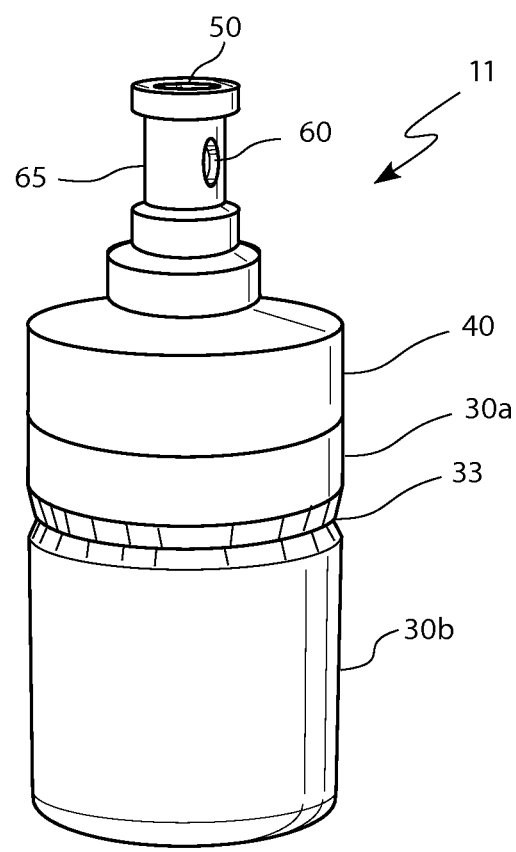
Figure 6D:
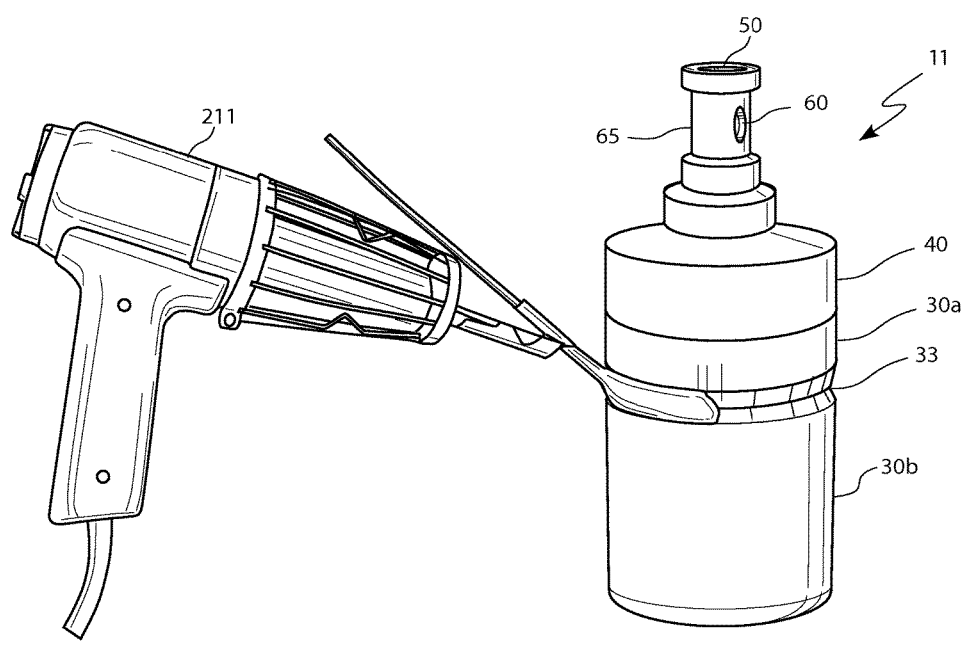

In another exemplary embodiment, once the housing sections 30*a* and 30*b* are separated as shown in FIG. 5*a* and the old/used core/filter 20 is replaced with a new core/filter 25, the housing sections 30*a* and 30*b* may be joined together to create a remanufactured water filter assembly 11 as shown in FIGS. 6*b-c*. Before coupling the section 30*a* to section 30*b*, in one exemplary embodiment, the edge 31 of section 30*a* and edge 32 of section 30*b* may be chamfered/beveled to create a grove/channel 33 once the sections 30*a* and 30*b* are in contact with each other as shown in FIG. 6*c*. The edges 31 and 32 may be chamfered/beveled using, for example, a cutting lathe, a grinder machine, and/or sanding machine. Once the edges 31 and 32 are chamfered/beveled, the sections 30*a* and 30*b* may be welded together as shown in FIG. 6*d*. Welding may be performed using, for example, a plastic welding gun as shown in FIG. 6*d*. In one exemplary embodiment, a welding gun 211 (shown in FIG. 6*d*) may be used to join sections 30*a* and 30*b*. The welding gun 211 may, for example, be HeJet500sH welding gun.

In another exemplary embodiment, the housing sections 30*a* and 30*b* may be joined together using spin welding. The sections 30*a* and 30*b* are spun in the opposite directions as they are being pressed together until the sections are fused together. A spin welder Branson SW300 may, for example, be used to join sections 30*a* and 30*b*.

Figure 7A:
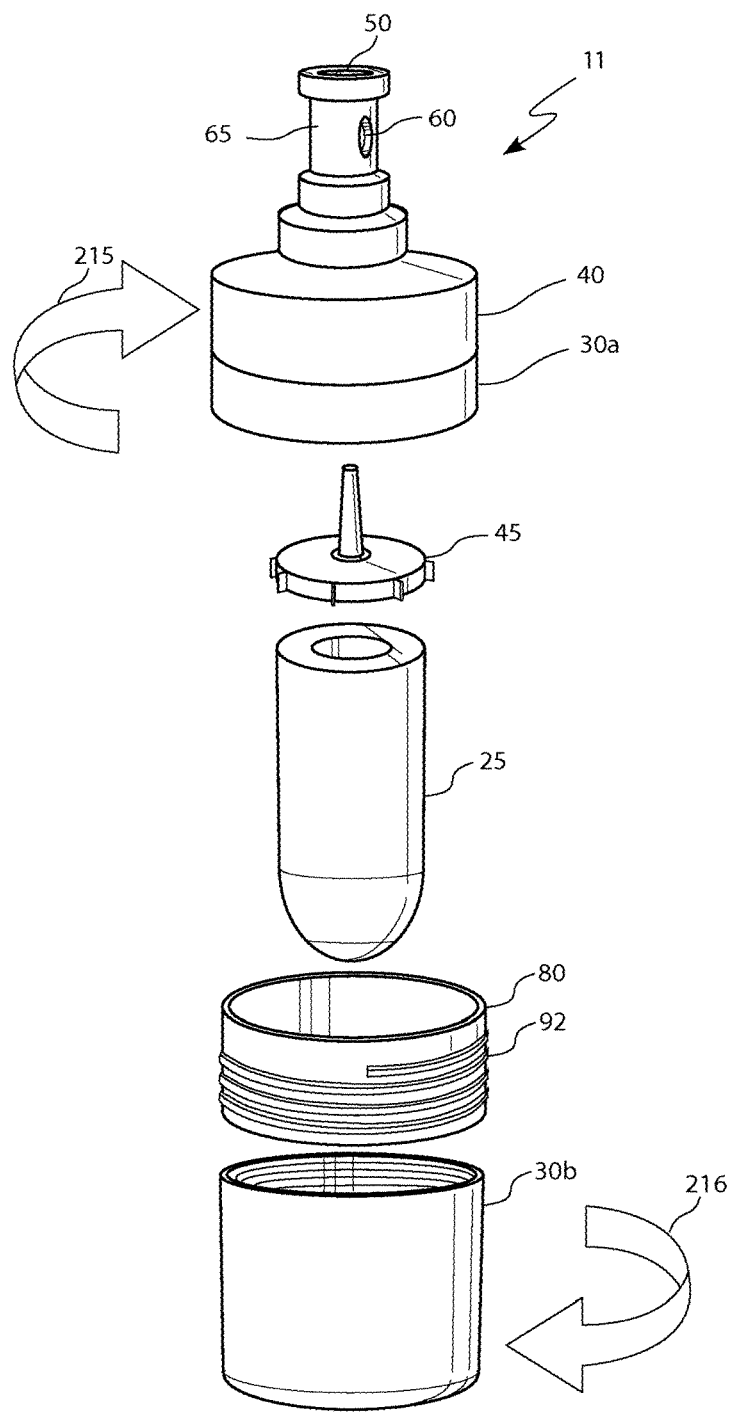
FIGS. 7a-c depict another exemplary embodiment for assembling a water filter assembly.
Figure 7B:
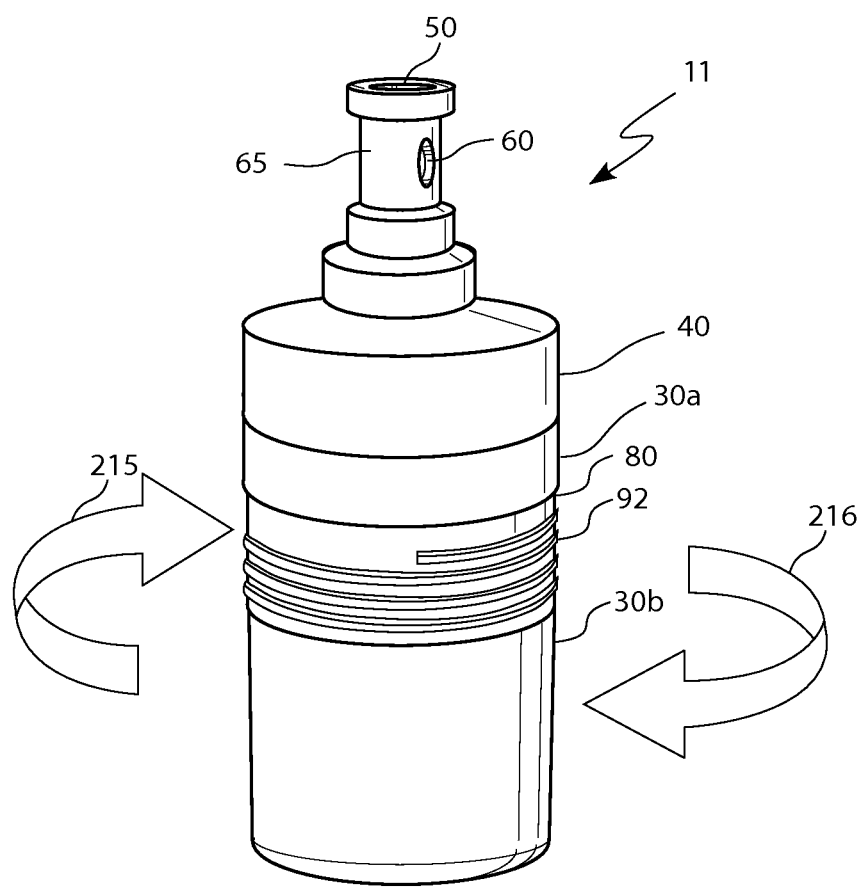
Figure 7C:
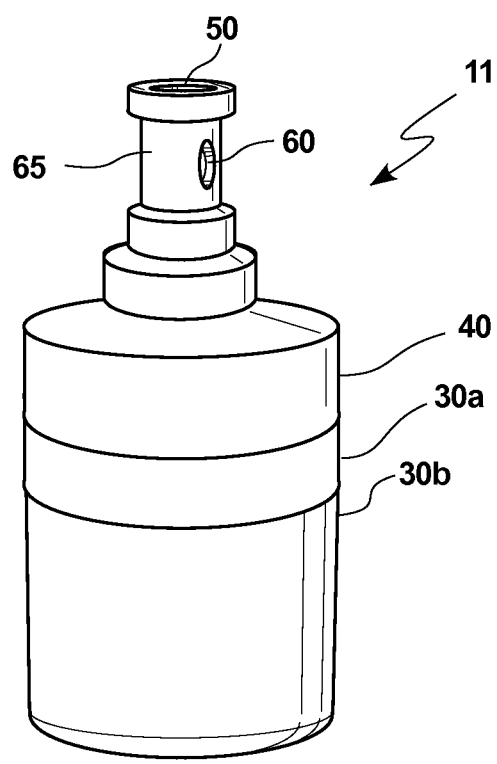

Referring to FIGS. 7*a-c*, in another exemplary embodiment according to the present application, the sections 30*a* and 30*b* may be coupled together using a sleeve 80 comprising an external thread 92 as shown in FIG. 7*a*. Sections 30*a* and 30*b* may be screwed onto the sleeve 80 as shown by the arrows 215 and 216 until sections 30*a* and 30*b* are sufficiently close to each other to allow the water to be filtered by the new core/filter 25 without leaking through the housing 30 as shown in FIG. 7*b-c*. The sleeve 80 may be made out of plastic, metal or any other material sufficient to keep the water from leaking from the housing 30. In one exemplary embodiment, a sealant (not shown) and/or adhesive (not shown) may also be used to prevent any possible leakage when sections 30*a* and 30*b* are joined using sleeve 80.

Figure 8A:
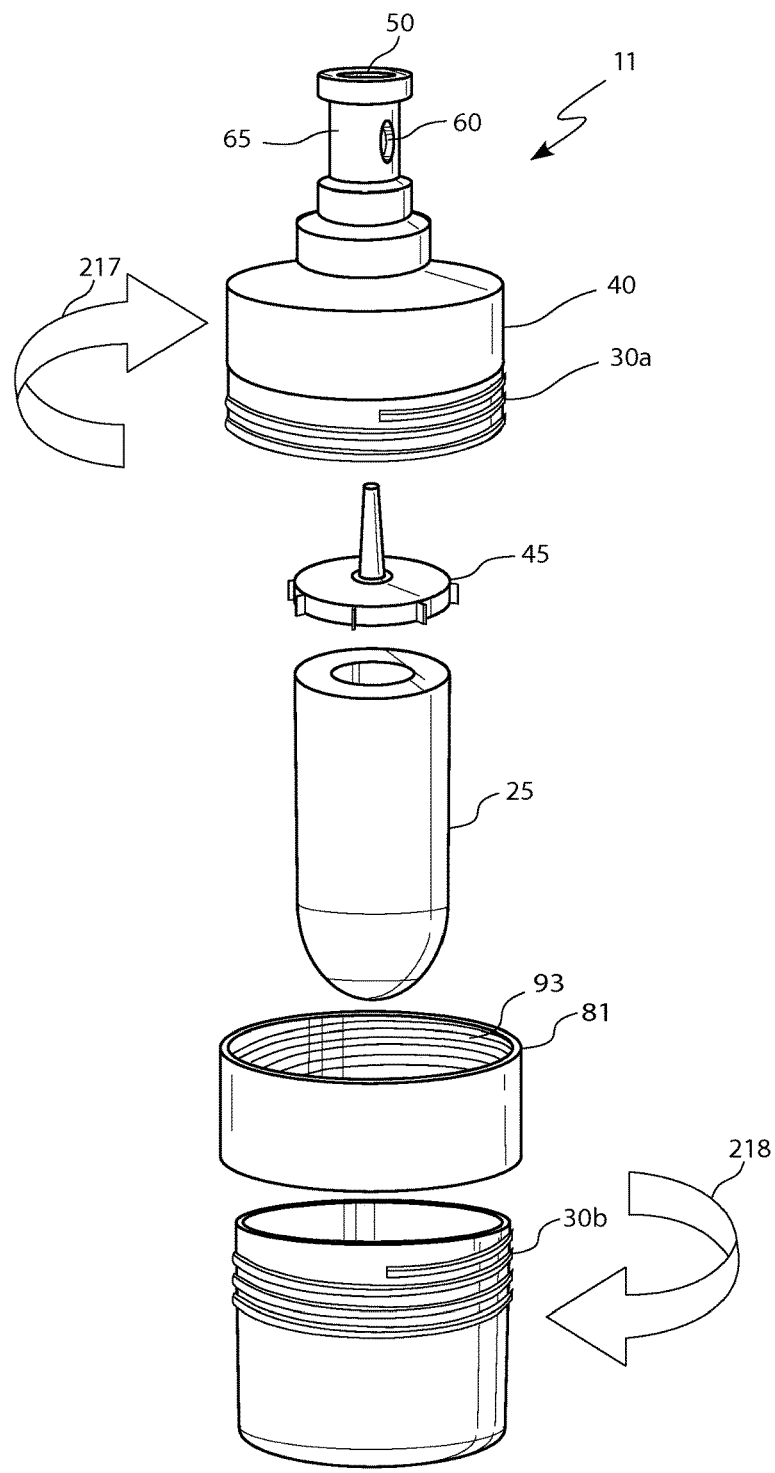
FIGS. 8a-b depict additional exemplary embodiment for assembling a water filter assembly.
Figure 8B:
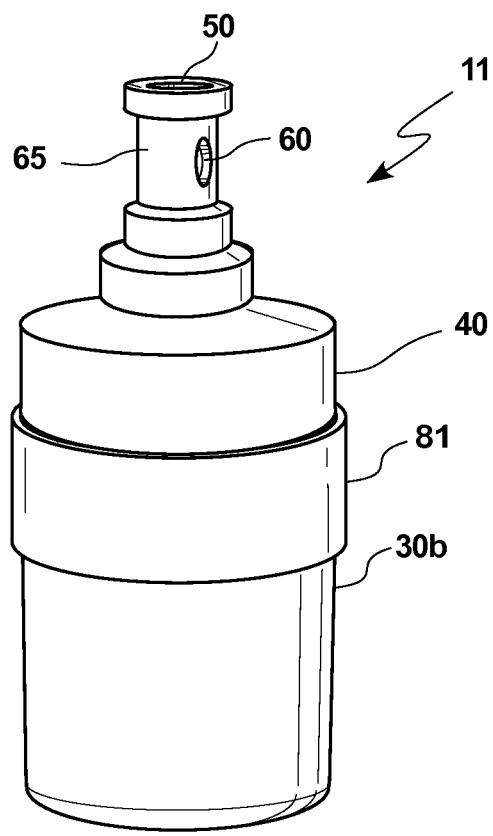

Referring to FIGS. 8*a-b*, in another exemplary embodiment according to the present application, the sections 30*a* and 30*b* may be coupled together using a sleeve 81 comprising an internal thread 93 as shown in FIG. 8*a*. Sections 30*a* and 30*b* may be screwed into the sleeve 81 as shown by the arrow 217 and 218 until sections 30*a* and 30*b* are sufficiently close to each other to allow the water to be filtered by the new core/filter 25 without leaking through the housing 30 as shown in FIG. 8*b*. The sleeve 81 may be made out of plastic, metal or any other material sufficient to keep the water from leaking from the housing 30. In one exemplary embodiment, a sealant (not shown) and/or adhesive (not shown) may also be used to prevent any possible leakage when sections 30*a* and 30*b* are joined using sleeve 81.

Figure 9:
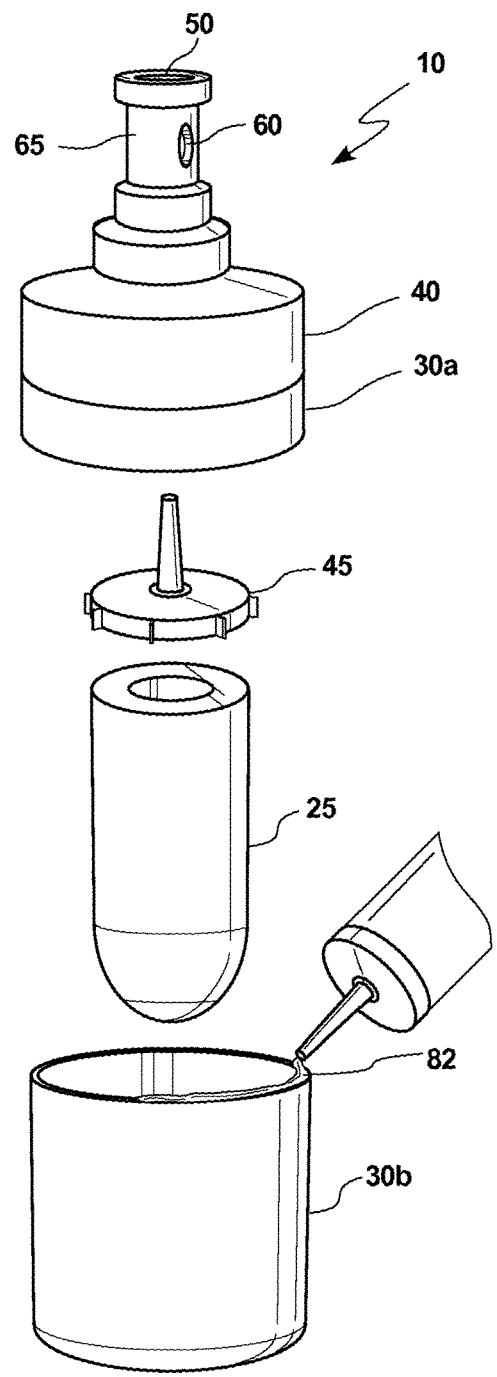
FIG. 9 depicts another exemplary embodiment for assembling a water filter assembly.

In another exemplary embodiment according to the present application, sections 30*a* and 30*b* may be coupled using an adhesive 82 as shown in FIG. 9 capable of coupling sections 30*a* and 30*b* and configured to prevent water leakage from the housing 30.

Figure 10A:
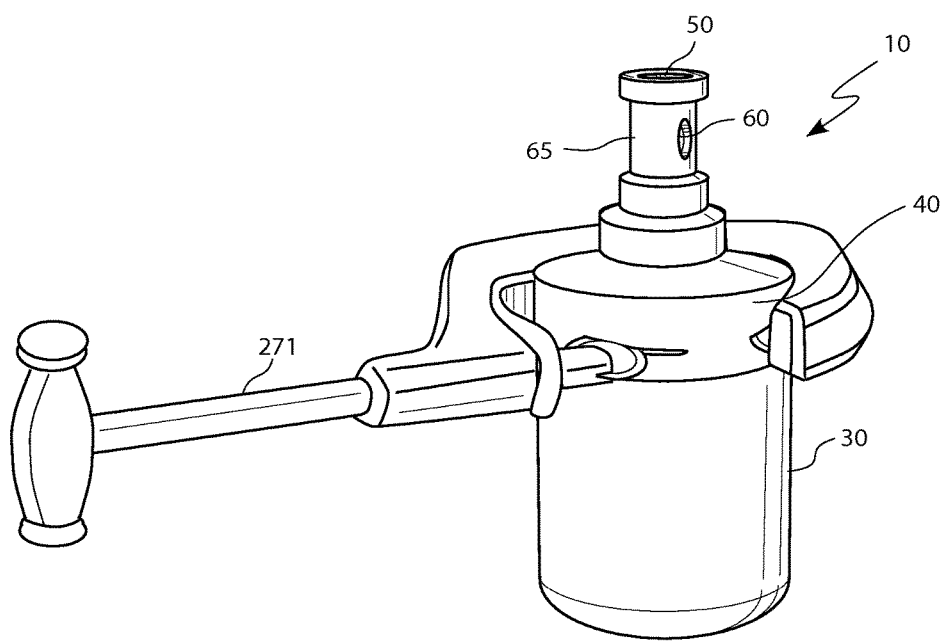
FIGS. 10a-b depict another exemplary embodiment for disassembling a water filter assembly.
Figure 10B:
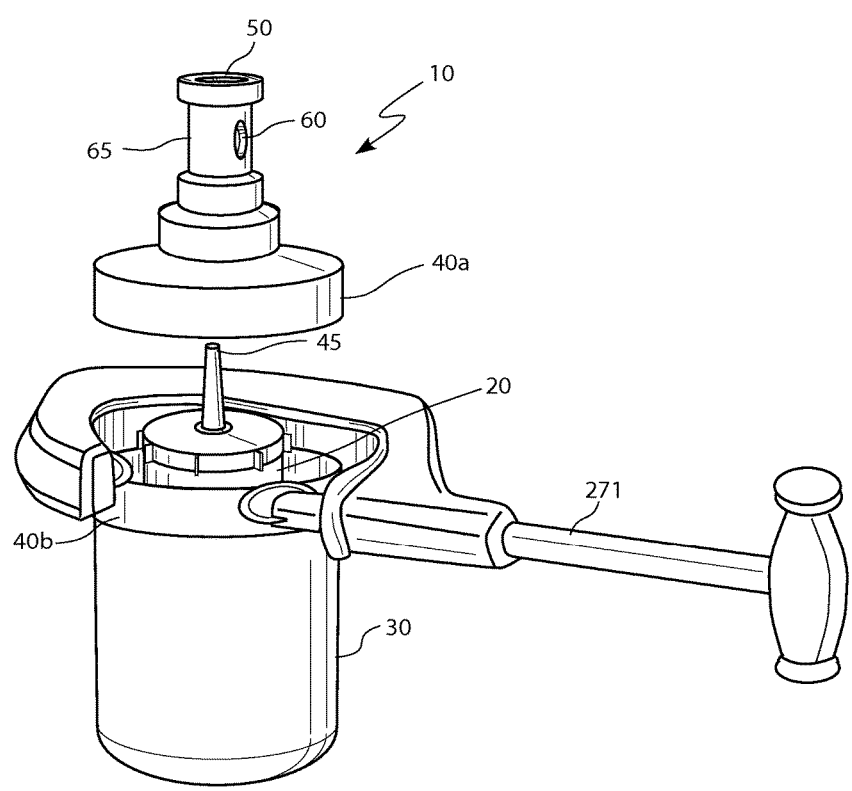

In another exemplary embodiment according to the present application, the old/used core/filter 20 may be removed by cutting the cap/cover/lid 40 into sections 40*a* and 40*b* as shown in FIGS. 10*a-b*. The cutting process may be accomplished by using either a pipe cutting machine 271 (shown in FIGS. 10*a-b*), a saw machine (not shown), a laser-cutting machine (not shown), a Computer Numerical Control (CNC) machine (not shown), and/or an ultrasonic blade machine (not shown). After the used core/filter 20 is replaced with a new core/filter 25, in one exemplary embodiment according to the present disclosure, the sections 40*a* and 40*b* may be fused or welded together using an ultrasonic welding machine or spin welding as described above. In another exemplary embodiment, the sections 40a and 40b may be fused or welded together using an ultrasonic welding machine and the energy director material 75 as described above. In another exemplary embodiment, the sections 40a and 40b may be coupled using the sleeve 80, the sleeve 81, or the adhesive 82 as described above.

In one exemplary embodiment, the adhesive and/or welding techniques used to couple the sections 30a and 30b as well as sections 40a and 40b, as described above, may be sufficient to:

(i) withstand city line water pressure that may be rated at 30-120 psi;

(ii) withstand degradation due to exposure to substances, impurities and/or chemicals that are being filtered out of the water;

(iii) withstand a shock of being dropped and/or vibrations that may be caused by dropping the filter assembly 11 down to the ground during installation and/or during transportation/delivery/shipping; and/or (iv) prevent any water leaks that may cause damage to nearby equipment and/or structure.

In another exemplary embodiment, the adhesive 82 used in any of the presently listed techniques may be made of food grade materials. In one exemplary embodiment, the adhesive 82 may be a polypropylene plastic, such as, for example, Bassell Pro-fax 7523. In another exemplary embodiment, the adhesive 82 may be an Ethylene Vinyl Acetate (EVA) based hot-melt adhesive that contains no hazardous ingredients as per 29 CFR 1910.1200.

In another exemplary embodiment according to the present application, if the cap/cover/lid 40 is screwed to the housing 30, the old/used core/filter 20 may be removed by unscrewing the housing 30 from the cap/cover/lid 40 as shown in FIG. 1b. Once the housing 30 is released from the cap/cover/lid 40, the old/used core/filter 20 is replaced with a new core/filter 25 and the housing 30 and the cap/cover/lid 40 may be screwed back with/to each other. In one exemplary embodiment, the adhesive 82 may also be applied to the threads of the housing 30 before the housing 30 and the cap/cover/lid 40 are screwed back with/to each other.

In another exemplary embodiment according to the present application, if the cap/cover/lid 40 is screwed and glued to the housing 30, the old/used core/filter 20 may be removed by heating up the area around the adhesive followed by unscrewing and/or releasing the pressure fit of the housing 30 from the cap/cover/lid 40. Once the housing 30 is released from the cap/cover/lid 40, the old/used core/filter 20 is replaced with a new core/filter 25 and the housing 30 and the cap/cover/lid 40 may be screwed and glued back with/to each other using, for example, the adhesive 82.

Figure 11:
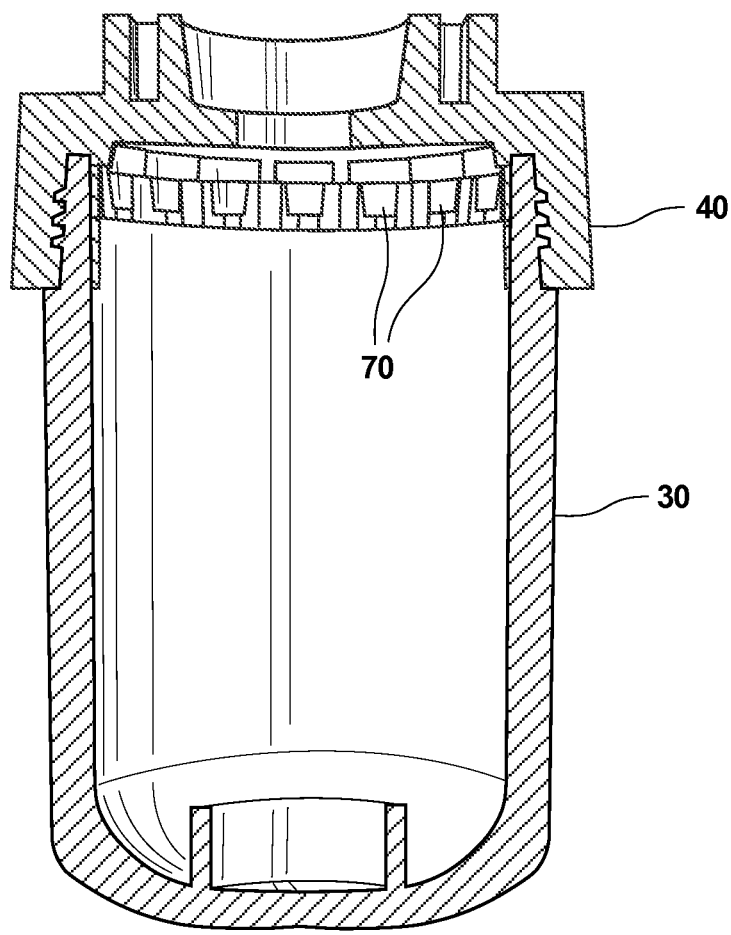
FIGS. 11-12 depict additional exemplary embodiment for disassembling a water filter assembly.
Figure 12:
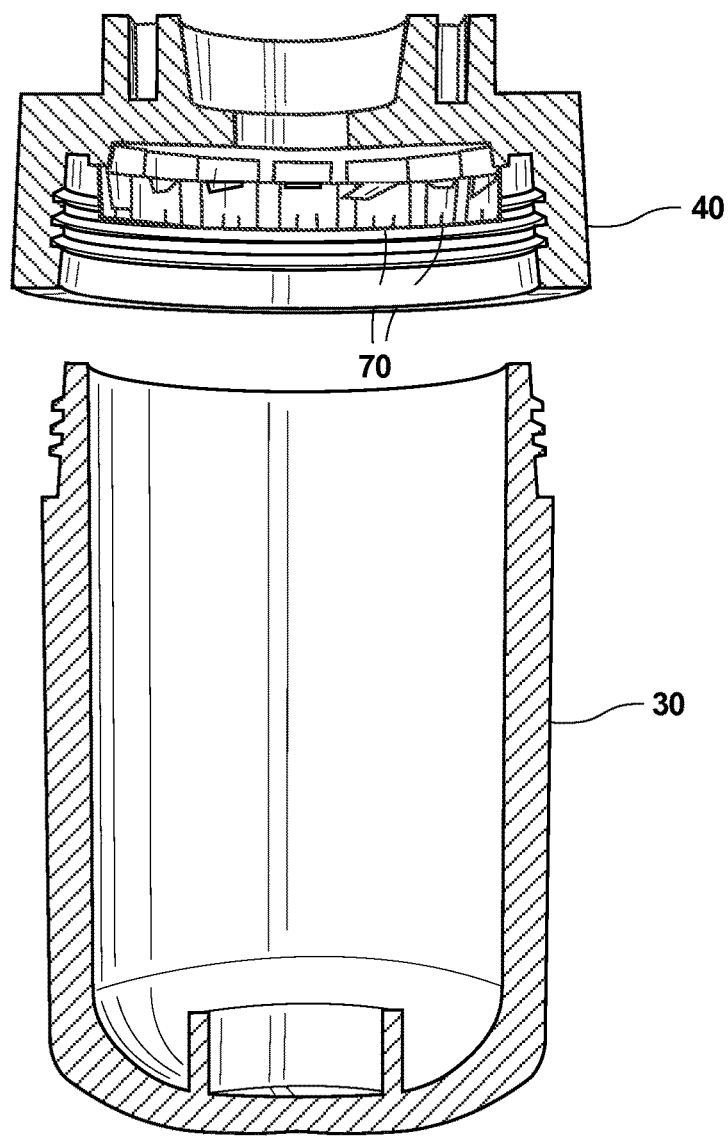

In another exemplary embodiment according to the present application, if the cap/cover/lid 40 is screwed to the housing 30 using, for example, self-locking teeth 70 as shown in FIG. 11, the old/used core/filter 20 may be removed by applying force to the housing 30 and/or cap/cover/lid 40 until the self-locking teeth 70 either break or are forced to release the housing 30 from the cap/cover/lid 40 as shown in FIG. 12. Once the housing 30 is forcibly separated from the cap/cover/lid 40, the old/used core/filter 20 is replaced with a new core/filter 25 and the housing 30 and the cap/cover/lid 40 may be screwed and/or glued back with/to each other.

In one exemplary embodiment, once the water filter assembly 11 is assembled, the water filter assembly 11 may be tested for leaks. Testing for leaks may be performed by either applying air or water through opening 50 and/or 60.

After testing of leaks is completed, in one exemplary embodiment, buffing and/or grinding may be used to remove any residue on the surface of the water filter assembly 11. In one exemplary embodiment, the surface of the water filter assembly 11 may be further covered by a label to cover any seams created during the assembly of the water filter assembly 11.

In one exemplary embodiment, during the remanufacturing process of the water filter assemblies 11, different inspection processes may be performed to try to monitor the quality of the remanufactured water filter assemblies 11. A random check process may be used, for example, to randomly test the quality of the water filter assemblies 11. In one exemplary embodiment, a water filter assembly 11 may be dropped, pressure tested, and/or dimensions verified during the random check process to confirm that the water filter assembly 11 complies with the required standards. A sanitary inspection process may be used to verify that the sections 30a and 30b are properly sanitized prior to assembly of the water filter assembly 11.

In one exemplary embodiment, the end caps 45 and/or 46 are not recycled/reused. In this embodiment, the end caps 45 and/or 46 removed from the water filter assembly 10 are replaced with new end caps (not shown) when assembling the water filter assembly 11.

Figure 13:
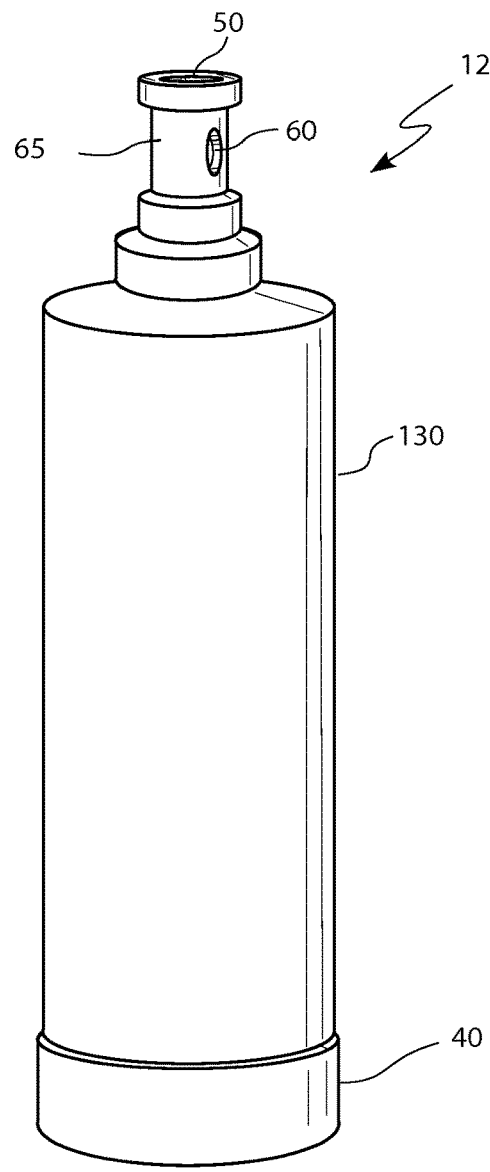
FIG. 13 depicts another water filter assembly as known in the art.

Although FIGS. 1a-b depict the water filtration assembly 10 with protrusion 65 as being part of the cap/lid/cover 40, it is to be understood that the processes described in the present disclosure may be applied to a water filtration assembly 12 shown in FIG. 13 wherein the protrusion 65 may be part of the housing 130.

Figure 14:
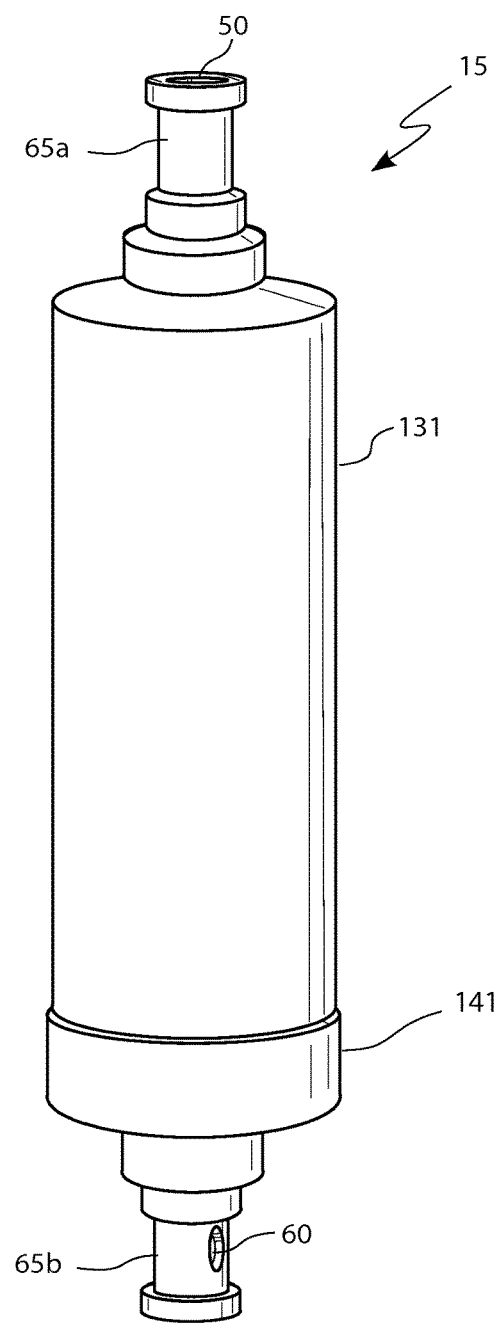
FIG. 14 depicts another water filter assembly as known in the art.

It is also to be understood that the processes described in the present disclosure may be applied to a water filtration assembly 15 having protrusions 65a and 65b in the housing 131 and cap/lid/cover 141 respectfully as shown in FIG. 14. In this embodiment, the unfiltered water may, for example, enter the water filter assembly 15 though an opening 50 defined by the protrusion 65a and exit through the opening 60 defined by the protrusion 65b after passing though the core/filter (not shown) that removes the impurities and/or chemical and/or toxic metals.

Although present application discloses remanufacturing water filtration assemblies, it is to be understood that the embodiments disclosed above may also be used to remanufacture other liquid filtration assemblies.

The specification and drawings are, accordingly, to be regarded in an illustrative rather than a restrictive sense. It will, however, be evident that additions, subtractions, deletions, and other modifications and changes may be made thereunto without departing from the broader spirit and scope of the invention as set forth in the claims.

While several illustrative embodiments of the invention have been shown and described, numerous variations and alternative embodiments will occur to those skilled in the art. Such variations and alternative embodiments are contemplated, and can be made without departing from the scope of the invention as defined in the appended claims.

As used in this specification and the appended claims, the singular forms "a," "an," and "the" include plural referents unless the content clearly dictates otherwise. The term "plurality" includes two or more referents unless the content clearly dictates otherwise. Unless defined otherwise, all technical and scientific terms used herein have the same meaning as commonly understood by one of ordinary skill in the art to which the disclosure pertains.

The foregoing detailed description of exemplary and preferred embodiments is presented for purposes of illustration and disclosure in accordance with the requirements of the law. It is not intended to be exhaustive nor to limit the invention to the precise form(s) described, but only to enable others skilled in the art to understand how the invention may be suited for a particular use or implementation. The possibility of modifications and variations will be apparent to practitioners skilled in the art. No limitation is intended by the description of exemplary embodiments which may have included tolerances, feature dimensions, specific operating conditions, engineering specifications, or the like, and which may vary between implementations or with changes to the state of the art, and no limitation should be implied therefrom. Applicant has made this disclosure with respect to the current state of the art, but also contemplates advancements and that adaptations in the future may take into consideration of those advancements, namely in accordance with the then current state of the art. It is intended that the scope of the invention be defined by the claims as written and equivalents as applicable. Reference to a claim element in the singular is not intended to mean "one and only one" unless explicitly so stated. Moreover, no element, component, nor method or process step in this disclosure is intended to be dedicated to the public regardless of whether the element, component, or step is explicitly recited in the claims. No claim element herein is to be construed under the provisions of 35 U.S.C. Sec. 112, sixth paragraph, unless the element is expressly recited using the phrase "means for . . . " and no method or process step herein is to be construed under those provisions unless the step, or steps, are expressly recited using the phrase "step(s) for . . . ."

What is claimed is:

1. A method comprising:
    providing a liquid filtration assembly comprising a first core disposed within a housing;
    separating the housing into a first section and a second section;
    removing the first core;
    positioning at least a portion of a second core in either the first section or the second section of the housing;
    providing an energy director material sandwiched between the first section and the second section; and
    ultrasonically welding the first section with the second section to completely enclose the second core within the housing.

2. The method of claim 1, wherein the liquid filtration assembly is configured to remove at least one type of impurity, at least one type of chemical, or at least one type of metal from liquid.

3. The method of claim 1, further comprising:
    at least partially beveling an edge of the first section and an edge of the second section.

4. The method of claim 3, wherein ultrasonically welding the first section and the second section comprises:
    aligning the beveled edge of the first section with the beveled edge of the second section to form a groove; and
    welding the first section with the second section.

5. The method of claim 1, further comprising:
    removing at least one end cap from the first core; and
    coupling the at least one end cap with the second core.

6. The method of claim 5, wherein removing at least one end cap from the first core comprises:
    applying pressure to disconnect the first core from the at least one end cap.

7. The method of claim 5, wherein removing at least one end cap from the first core comprises:
    applying heat to the first core or the at least one end cap; and
    applying pressure to disconnect the first core from the at least one end cap.

8. The method of claim 5, wherein removing at least one end cap from the first core comprises:
    freezing the first core;
    applying heat to the first core or the at least one end cap; and
    applying pressure to disconnect the first core from the at least one end cap.

9. The method of claim 5, wherein removing at least one end cap from the first core comprises:
    freezing the first core; and
    applying pressure to disconnect the first core from the at least one end cap.

10. The method of claim 5, wherein coupling the at least one end cap with the second core comprises:
    applying adhesive to join the at least one end cap with the second core.

11. The method of claim 5, wherein coupling the at least one end cap with the second core comprises:
    applying hotmelt process to join the at least one end cap with the second core.

12. The method of claim 1, further comprising:
    removing at least one type of bacteria, at least one type of virus, at least one type of impurity, chlorine, at least one type of metal or at least one type of chemical from the first section and from the second section.

13. The method of claim 1, wherein separating the liquid filtration assembly into a first section and a second section comprises:
    applying heat to the liquid filtration assembly; and
    applying pressure to separate the housing from a cap associated with the housing.

14. The method of claim 1, wherein separating the liquid filtration assembly into a first section and a second section comprises:
    applying pressure to separate the housing from a cap associated with the housing.

15. The method of claim 1, wherein separating the liquid filtration assembly into a first section and a second section comprises:
    providing a pipe cutting device, a saw machine, a laser-cutting machine, a Computer Numerical Control (CNC) machine, or an ultrasonic blade machine;
    cutting the housing to form the first section and the second section using the pipe cutting device, the saw machine, the laser-cutting machine, the Computer Numerical Control (CNC) machine, or the ultrasonic blade machine.

16. The method of claim 1, wherein separating the liquid filtration assembly into a first section and a second section comprises:
    providing a pipe cutting device, a saw machine, a laser-cutting machine, a Computer Numerical Control (CNC) machine, or an ultrasonic blade machine;
    cutting a cap associated with the housing of the liquid filtration assembly to form the first section and the second section using the pipe cutting device, the saw machine, the laser-cutting machine, the Computer Numerical Control (CNC) machine, or the ultrasonic blade machine.

17. A method comprising:
  providing at least a first section and a second section of a liquid filtration assembly;
  positioning at least a portion of a core in either the first section or the second section of the liquid filtration assembly;
  providing an energy director material sandwiched between the first section and the second section; and
  ultrasonically welding the first section with the second section to completely enclose the core within the first section and the second section.

18. The method of claim 17, wherein after ultrasonically welding the first section and the second section the liquid filtration assembly is configured to remove at least one type of impurity, at least one type of chemical, or at least one type of metal from liquid.

19. The method of claim 17, further comprising:
  at least partially beveling an edge of the first section and an edge of the second section.

20. The method of claim 19, wherein ultrasonically welding the first section and the second section comprises:
  aligning the beveled edge of the first section with the beveled edge of the second section to form a groove; and
  welding the first section with the second section.

21. The method of claim 17, further comprising:
  coupling at least one end cap with the core.

\* \* \* \* \*